(12) United States Patent
Ansems et al.

(10) Patent No.: US 6,841,620 B2
(45) Date of Patent: Jan. 11, 2005

(54) POLYOLEFIN COMPOSITION WITH IMPROVED IMPACT PROPERTIES

(75) Inventors: Patricia Ansems, West Columbia, TX (US); H. Craig Silvis, Midland, MI (US); Lisa S. Madenjian, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/281,409

(22) Filed: Oct. 25, 2002

(65) Prior Publication Data

US 2003/0092840 A1 May 15, 2003

Related U.S. Application Data

(63) Continuation of application No. 09/602,329, filed on Jun. 23, 2000, now Pat. No. 6,472,473.
(60) Provisional application No. 60/140,776, filed on Jun. 24, 1999, and provisional application No. 60/197,050, filed on Apr. 14, 2000.

(51) Int. Cl.⁷ .......................... C08L 23/00; C08F 10/02
(52) U.S. Cl. .................. 525/191; 525/192; 525/193; 525/197; 525/212; 525/240; 525/261; 525/331.8; 525/333.9; 525/349; 525/351; 525/352
(58) Field of Search ................. 525/191, 192, 525/193, 197, 212, 240, 261, 331.8, 333.9, 349, 351, 352

(56) References Cited

U.S. PATENT DOCUMENTS

| | | |
|---|---|---|
| 3,058,944 A | 10/1962 | Breslow et al. |
| 3,203,936 A | 8/1965 | Breslow et al. |
| 3,203,937 A | 8/1965 | Breslow et al. |
| 3,282,864 A | 11/1966 | Bost et al. |
| 3,298,975 A | 1/1967 | Feild et al. |
| 3,336,268 A | 8/1967 | Cox |
| 3,341,480 A | 9/1967 | Feild |
| 3,377,415 A | 4/1968 | Oppenlander |
| 3,389,198 A | 6/1968 | Taber |
| 3,530,108 A | 9/1970 | Oppenlander |
| 3,645,992 A | 2/1972 | Elston |
| 3,687,920 A | 8/1972 | Johnson |
| 3,893,989 A | 7/1975 | Leicht et al. |
| 3,914,342 A | 10/1975 | Mitchell |
| 3,959,425 A | 5/1976 | Herrington |
| 4,003,712 A | 1/1977 | Miller |
| 4,076,698 A | 2/1978 | Anderson et al. |
| 4,113,802 A | 9/1978 | Matteoli et al. |
| 4,200,556 A | 4/1980 | Robinson et al. |
| 4,352,892 A | 10/1982 | Lohmar |
| 4,532,189 A | 7/1985 | Mueller |
| 4,579,905 A | 4/1986 | Krabbenhoft |
| 4,584,347 A | 4/1986 | Harpell et al. |
| 4,694,025 A | 9/1987 | Park |
| 4,714,716 A | 12/1987 | Park |
| 4,820,471 A | 4/1989 | van der Molen |
| 4,916,198 A | 4/1990 | Scheve et al. |
| 5,008,204 A | 4/1991 | Stehling |
| 5,037,895 A | 8/1991 | Marker et al. |
| 5,116,881 A | 5/1992 | Park et al. |
| 5,180,751 A | 1/1993 | Park et al. |
| 5,266,643 A | 11/1993 | Mustonen et al. |
| 5,272,236 A | 12/1993 | Lai et al. |
| 5,278,272 A | 1/1994 | Lai et al. |
| 5,284,613 A | 2/1994 | Ali et al. |
| 5,348,795 A | 9/1994 | Park |
| 5,358,792 A | 10/1994 | Mehta et al. |
| 5,373,236 A | 12/1994 | Tsui et al. |
| 5,414,027 A | 5/1995 | DeNicola, Jr. et al. |
| 5,491,019 A | 2/1996 | Kuo |
| 5,519,785 A | 5/1996 | Hara |
| 5,527,573 A | 6/1996 | Park et al. |
| 5,567,742 A | 10/1996 | Park |
| 5,605,936 A | 2/1997 | DeNicola, Jr. et al. |
| 5,616,627 A | 4/1997 | Sakurai et al. |
| 5,641,848 A | 6/1997 | Giacobbe et al. |
| 5,747,594 A | 5/1998 | deGroot et al. |
| 5,767,033 A | 6/1998 | Imuta et al. |
| 5,844,045 A | 12/1998 | Kolthammer et al. |

(List continued on next page.)

FOREIGN PATENT DOCUMENTS

| | | |
|---|---|---|
| CA | 797 917 | 10/1968 |
| CA | 1 024 296 | 1/1978 |

(List continued on next page.)

OTHER PUBLICATIONS

R. A. Abramovitch, Polar Radicals in Aromatic Substitution, *Intra–Science Chemistry Reports*, pp. 211–218, 1969.

R. A. Abramovitch et al., "Reaction of Sulphonyl Azides with Unstrained Olefins", *J. Chem. Soc.*, pp. 2169–2172, 1974.

(List continued on next page.)

*Primary Examiner*—James J. Seidleck
*Assistant Examiner*—Olaga Asinovsky

(57) ABSTRACT

The present invention includes a composition comprising a coupled impact propylene copolymer. Preferably, the coupled impact propylene copolymer has an elastomeric phase that is present in an amount of at least 9 weight percent of the coupled propylene copolymer. Articles formed from the coupled propylene copolymer exhibit improved directionally balanced impact properties as compared with articles formed form comparable noncoupled impact propylene copolymers and also exhibit improved ductile-to-brittle transition temperatures compared with comparable noncoupled impact propylene copolymers. The invention also includes methods for making the coupled impact propylene copolymers using coupling agents, preferably, poly(sulfonyl azides). The invention further includes articles of manufacture that are made from the coupled impact propylene copolymer of the invention.

29 Claims, No Drawings

U.S. PATENT DOCUMENTS

| | | | |
|---|---|---|---|
| 5,869,575 | A | 2/1999 | Kolthammer et al. |
| 5,883,151 | A | 3/1999 | Raetzsch et al. |
| 5,929,129 | A | 7/1999 | Feichtinger |
| 6,054,540 | A | 4/2000 | Chaudhary et al. |
| 6,103,833 | A | 8/2000 | Hogt et al. |
| 6,143,829 | A | 11/2000 | Babb et al. |
| 6,143,854 | A | 11/2000 | Bamberger |
| 6,207,754 | B1 | 3/2001 | Yu |
| 6,211,302 | B1 | 4/2001 | Ho et al. |
| 6,284,842 | B1 * | 9/2001 | Ho et al. ............ 525/194 |
| 6,417,242 | B1 | 7/2002 | Hughes et al. |
| 6,472,473 | B1 * | 10/2002 | Ansems et al. ............ 525/191 |
| 6,506,848 | B2 * | 1/2003 | Hoenig et al. ............ 525/331.8 |

FOREIGN PATENT DOCUMENTS

| | | |
|---|---|---|
| CA | 1 219 389 | 3/1987 |
| DE | 1 569 025 | 7/1970 |
| EP | 0 351 208 | 1/1990 |
| EP | 0 474 376 | 3/1992 |
| EP | 0 595 252 | 5/1994 |
| EP | 0 702 032 | 3/1996 |
| EP | 0 747 376 | 5/1996 |
| EP | 0 634 454 | 11/1997 |
| EP | 0 625 545 | 1/1998 |
| EP | 0 634 441 | 5/1998 |
| EP | 0 872 517 | 10/1998 |
| GB | 1 080 619 | 8/1967 |
| GB | 2 205 103 A | 11/1988 |
| JP | 46-31756 | 9/1971 |
| JP | 50-133248 | 10/1975 |
| JP | 51-134762 | 11/1976 |
| WO | 93/04486 | 3/1993 |
| WO | 96/07681 | 3/1996 |
| WO | 96/20247 | 7/1996 |
| WO | 97/20888 | 6/1997 |
| WO | 97/20889 | 6/1997 |
| WO | 99/10415 | 3/1999 |
| WO | 99/10424 | 3/1999 |
| WO | 99/10426 | 3/1999 |
| WO | 00/02960 | 1/2000 |
| WO | 00/02961 | 1/2000 |
| WO | 00/52091 | 9/2000 |
| WO | 00/53669 | 9/2000 |
| WO | 00/78858 | 12/2000 |
| WO | 00/78861 | 12/2000 |

OTHER PUBLICATIONS

R. A. Abramovitch et al., Intramolecular Insertion of Arylsulfonylnitrenes into Aliphatic Side Chains, *J. Org. Chem.,* vol. 42, No. 17, pp. 2920–2926, 1977.

R. A. Abramovitch et al., Pyrolysis of Phenylaikylsulphonyl Azides and 2–phenethyl Azidofomate. Selectivity of Sulphonylnitrenes And Constrast between Sulphonyl–and Carbonyl–nilrenes, *J. Chem. Soc. Chem Commun.,* pp. 1087–1088, 1981.

R. A. Abramovitch et al., "Reaction of Aromatic Sulfonyl Azides with Dienes", *J. Org. Chem.,* vol. 46, pp. 330–335, 1981.

H. Radusch et al., "Chemical coupling of polystyrene and polybutadiene in melt mixtures by using an organic sulfonylazide", *Die Angewandte Makromolekulare Chemie,* vol. 204, pp. 177–189, 1993.

N. Takashima et al., "The Processings of Crosslinked Plastics", *Kogaku Kogyo (Chemical Industry),* pp. 378–383, 1969.

D. S. Breslow et al., "Thermal Reactions of Sulfonyl Azides", *Amer. Chem. Soc.,* vol. 91, pp. 2273–2279, 1969.

*Derwent Chemical Abstract No. 1977–02552Y of JP 51–134762A.

*Derwent Chemical Abstract No. 1977–88691Y of JP 50–133248.

M. Xanthos, "Interfacial Agents of Multiphase Polymer systems: Recent Advances", *Polymer Engineering and Science,* vol. 28, pp. 1392–1400, 1988.

K. A. Chaffin et al., "Semicrystalline Blends of Polyethylene and Isotactic Polypropylene: Improving Mechanical Performance by Enhancing the Interfacial Structure", *Journal of Polymer Science: Part B: Polymer Physics,* vol. 38, pp. 108–121, 2000.

E. P. Moore, *Polypropylene Handbook,* pp. 15–45, 1996.

E.P. Moore, *Polypropylene Handbook,* p. 220, 1996.

E.P. Moore, *Polypropylene Handbook,* pp. 330–332, 1996.

Han and Shetty, "Studies on Multilayer Film Coextrusion III. The Rheology of Blown Film Coextension", *Polymer Engineering and Science,* vol. 18, No. 3, pp. 187–199, 1978.

Inoue, "Selective Crosslinking in Polymer Blends. I. Novel Selective Crosslink Systems for Polypropylene/Unsaturated Elastomer Blends", *Journal of Applied Polymer Science,* vol. 54. pp. 709–721, 1994.

Inoue, "Selective Crosslinking in Polymer Blends. II. Its Effect on Impact Strength and Other Mechanical Properties of Polyproplene/Unsaturated Elastomer Blends", *Journal of Applied Polymer Science,* vol. 54, pp. 723–733, 1994.

Inoue and Suzuki, "Selective Crosslinking Reaction in Polymer Blends. III. The Effects of the Crosslinking of Dispersed EPDM Particles on the Impact Behavior of PP/EPDM Blends", *Journal of Applied Polymer Science,* vol. 56, pp. 1113–1125, 1995.

U.S. Appl. No. 09/133,576 filed Aug. 13, 1998 (43324A), Craig Silvis et al., "In–Situ Rhelogy Modification of Polyolefins".

U.S. Appl. No. 10/121,985 filed Apr. 12, 2002 (60329A), Li–Min Tau et al., "Composition and Films Thereof".

* cited by examiner

POLYOLEFIN COMPOSITION WITH IMPROVED IMPACT PROPERTIES

This application is a Continuation of 09/602,329 filed Jun. 23, 2000, now U.S. Pat. No. 6,472,473 B1 claims the benefit of U.S. Provisional Application Nos. 60/140,776, filed Jun. 24, 1999, and 60/197,050, filed Apr. 14, 2000 which is incorporated by reference herein in its entirety.

BACKGROUND

To improve the impact properties of polypropylene homopolymers (and random copolymers), an elastomeric component is typically added, either by way of the production of an in-reactor blend of a propylene polymer and an elastomeric component (an impact propylene copolymer) or by way of compounding of a propylene polymer and an elastomeric component. In the former method the propylene polymer and the elastomeric component are produced in one or more reactors of the same process.

Both of these methods of improving the impact of polypropylene do not significantly contribute to increasing the melt strength of the resulting polypropylene impact copolymer.

And although both methods result in a propylene polymer with improved impact properties (when formed into articles), these impact properties often show an imbalance between the notched impact tested parallel to the polymer injection flow direction of the injection molded product, and the notched impact tested perpendicular to the polymer injection flow direction of the injection molded product. The notched impact tested on specimens cut perpendicular to the direction of orientation (that is perpendicular to the polymer injection flow direction), with the notch in the direction of orientation (parallel to the polymer injection flow direction), is typically much lower. The polymer injection flow direction is the direction or line along which the polymer is introduced into a mold or the direction or line along which the polymer is extruded. Polymers such as propylene polymers will tend to orient themselves along this line of direction.

What is desired is a polymer resin, which provides directionally balanced impact properties for articles made from the resin, while simultaneously having increased melt strength. Additionally, it would be desirable to provide a polymer resin, which is easy to fabricate into articles and exhibits a ductile-to-brittle transition temperature of 0° C. or lower.

As used herein, the following terms shall have the following meanings:

"Coupling agent" means a chemical compound that contains at least two reactive groups that are each capable of forming a carbene or nitrene group that are capable of inserting into the carbon hydrogen bonds of CH, CH2, or CH3 groups, both aliphatic and aromatic, of a polymer chain. The reactive groups together can couple polymer chains. It may be necessary to activate a coupling agent with heat, sonic energy, radiation or other chemical activating energy, for the coupling agent to be effective for coupling polymer chains. Examples of chemical compounds that contain a reactive group capable of forming a carbene group include, for example, diazo alkanes, geminally-substututed methylene groups, and metallocarbenes. Examples of chemical compounds that contain reactive groups capable of forming nitrene groups, include, but are not limited to, for example, phosphazene azides, sulfonyl azides, formyl azides, and azides.

"Impact propylene copolymers" are commercially available and are well known within the skill in the art, for instance, as described by E. P. Moore, Jr in *Polypropylene Handbook*, Hanser Publishers, 1996, page 220–221 and U.S. Pat. Nos. 3,893,989 and 4,113,802. The term "impact propylene copolymer" is used herein to refer to heterophasic propylene copolymers where polypropylene is the continuous phase and an elastomeric phase is dispersed therein. Those of skill in the art recognize that this elastomeric phase may also contain crystalline regions, which for purposes of the current invention are considered part of the elastomeric phase. The impact propylene copolymers result from an in-reactor process rather than physical blending. Usually the impact propylene copolymers are formed in a dual or multi-stage process, which optionally involves a single reactor with at least two process stages taking place therein, or optionally multiple reactors.

"Impact properties" refer to properties of articles such as impact strength, which is measured by any means within the skill in the art, for instance, Izod impact energy as measured in accordance with ASTM D 256, MTS Peak Impact Energy (dart impact) as measured in accordance with ASTM D 3763–93, and MTS total Impact Energy as measured in accordance with ASTM D-3763. The ductile-to-brittle transition temperature (DBTT) is also an impact property of an article made from a polymer. The ductile-to-brittle transition temperature defines, for a given set of conditions, the temperature at which an object transitions from a predominantly ductile mode of failure to a predominantly brittle mode of failure. The ductile-to-brittle transition temperature can be calculated using techniques known to one of skill in the art.

SUMMARY OF THE INVENTION

The invention includes a composition comprising a coupled impact propylene copolymer. The coupled impact propylene copolymer is formed by the reaction of a coupling agent, such as a bis(sulfonyl azide), with an impact propylene copolymer. Advantageously, the impact propylene copolymers used for the invention have at least about 5 weight percent, preferably at least about 9 weight percent, more preferably at least about 13 weight percent, of an elastomeric phase based on the total weight of the impact propylene copolymer. Preferably, the elastomeric phase is less than about 45 weight percent, more preferably less than about 40 weight percent, most preferably less than about 35 weight percent, of the total weight of the impact propylene copolymer.

When the continuous phase of the impact propylene copolymer is a homopolymer propylene polymer and the elastomeric phase is comprised of a copolymer or terpolymer containing monomer units derived from ethylene, the impact propylene copolymer preferably contains at least about 5 weight percent, more preferably at least about 7 weight percent, most preferably at least about 9 weight percent —CH2CH2— units derived from ethylene monomer based on the total weight of the impact propylene copolymer. Preferably, such an impact propylene copolymer contains less than about 30 weight percent, more preferably less than about 25 weight percent, most preferably less than about 20 weight percent —CH2CH2— units derived from ethylene monomer based on the total weight of the impact propylene copolymer.

The invention also includes a method for coupling an impact propylene copolymer using a coupling agent, such as a bis(sulfonyl azide). The method improves the impact properties of the impact propylene copolymer and also increases the melt strength of the resulting coupled impact propylene copolymer resin to a level of at least about 1.25 times, preferably at least about 1.5 times, that of a comparable noncoupled impact propylene copolymer. All values for "melt strength" are determined by the method as set forth in the Examples. A comparable noncoupled impact propylene copolymer is the same polymer used to make the coupled impact propylene copolymer, but has not been coupled. Preferably, the coupled impact propylene copolymer resins have a melt strength of at least about 8, more preferably a melt strength of at least about 15 cN, further more preferably a melt strength of at least about 30 cN, most preferably a melt strength of at least about 50 cN and in some instances a melt strength of at least about 60 cN.

Examples of impact properties that are improved in the coupled impact propylene copolymer of the invention compared to the comparable noncoupled impact propylene copolymers, include: higher impact strength at low temperatures as exhibited by articles formed from the coupled impact propylene copolymer and an improvement in the ductile-to-brittle transition temperature, which is reduced in articles formed from the coupled impact propylene copolymer of the invention.

Additionally, in all aspects, articles formed from the coupled impact propylene copolymer of the invention exhibit an improvement in the directional balance of the impact properties as compared to articles formed from a comparable noncoupled impact propylene copolymer. (i.e. a reduction of the imbalance between the impact properties as measured parallel to the polymer injection flow direction versus perpendicular to the polymer injection flow direction). This reduction in directional imbalance of the impact properties is indicated by a reduction in the difference between ductile-to-brittle transition temperatures measured parallel and perpendicular to the polymer injection flow direction for an article fabricated from the coupled impact propylene copolymer of the invention as compared with the difference between ductile-to-brittle transition temperatures measured parallel and perpendicular to the polymer injection flow direction for an article fabricated from a comparable noncoupled impact propylene copolymer.

In some aspects of the invention, the reduction in the DBTT for articles formed from the coupled impact propylene copolymer of the current invention versus articles formed from comparable noncoupled impact propylene copolymers (as calculated from the notched Izod values measured in accordance with ASTM D-256 with the notch perpendicular to the polymer injection flow direction) will be at least about 10° C., preferably at least about 15° C., more preferably at least about 20° C. and in some instances at least about 25° C.

In another aspect of the invention, articles formed from the coupled impact propylene copolymers of the current invention exhibit a DBTT as calculated from notched Izod values measured in accordance with ASTM D-256 with the notch perpendicular to the polymer injection flow direction, of about −5° C. or less, preferably of about −10° C. or less, more preferably of about −15° C. or less, most preferably −20° C. or less.

For all the embodiments of the invention, the articles to be tested to determine DBTT should be edge-gated injection molded plaques that have a single polymer injection flow direction. For all embodiments, the Izod values are measured in accordance with ASTM D-256 and the values for DBTT are calculated in accordance with techniques known to one of ordinary skill in the art.

In a most preferred embodiment, articles made from the coupled impact propylene copolymers exhibit improvements in the directional balance of the impact properties together with improvements in the DBTT and a reduction of the DBTT as compared with comparable noncoupled impact propylene copolymers.

Further, articles formed from the coupled impact propylene copolymer resins of the present invention advantageously maintain the stiffness of the comparable noncoupled impact propylene copolymer.

DETAILED DESCRIPTION OF THE INVENTION

The process to produce this improved impact propylene copolymer involves coupling of the impact propylene copolymer using a coupling agent. The coupling reaction is implemented via reactive extrusion or any other method which is capable of mixing the coupling agent with the impact propylene copolymer and adding sufficient energy to cause a coupling reaction between the coupling agent and the impact propylene copolymer. Preferably, the process is carried out in a single vessel such as a melt mixer or a polymer extruder, such as described in U.S. patent application Ser. No. 09/133,576 filed Aug. 13, 1998 which claims the benefit of U.S. Provisional Application No. 60/057,713 filed Aug. 27, 1997, both of which are incorporated by reference herein in their entity. The term extruder is intended to include its broadest meaning and includes such devices as a device which extrudes pellets as well as an extruder which produces the extrudate for forming into films, blow molded articles, profile and sheet extruded articles, foams and other articles.

As discussed earlier, the impact propylene copolymers have a continuous phase, which is comprised of a propylene polymer, and an elastomeric phase. The propylene polymer of the continuous phase typically will be a homopolymer propylene polymer or a random propylene copolymer, more typically a homopolymer propylene polymer. The propylene polymer may be made using Ziegler-Natta catalyst, constrained geometry catalyst, metallocene catalyst, or any other suitable catalyst system. When the propylene polymer making up the continuous phase is a homopolymer propylene polymer, the crystallinity of the propylene polymer, as determined by differential scanning calorimetry, is preferably at least about 50 percent, more preferably at least about 55 percent, most preferably at least about 62 percent. The methods for determining percent crystallinity using a differential scanning calorimetry are know to one of skill in the art.

The elastomeric phase may be made using constrained geometry catalyst, Ziegler-Natta catalyst, metallocene catalyst, or any other suitable catalyst.

The preferred coupling agent is a poly(sulfonyl azide), more preferably a bis(sulfonyl azide). Examples of poly (sulfonyl azides) useful for the invention are described in WO 99/10424. Poly(sulfonyl)azides include such compounds as 1,5-pentane bis(sulfonyl azide), 1,8-octane bis (sulfonyl azide), 1,10-decane bis(sulfonyl azide), 1,10-octadecane bis(sulfonyl azide), 1-octyl-2,4,6-benzene tris (sulfonyl azide), 4,4'-diphenyl ether bis(sulfonyl azide), 1,6-bis(4'-sulfonazidophenyl)hexane, 2,7-naphthalene bis (sulfonyl azide), and mixed sulfonyl azides of chlorinated aliphatic hydrocarbons containing an average of from 1 to 8 chlorine atoms and from 2 to 5 sulfonyl azide groups per molecule, and mixtures thereof. Preferred poly(sulfonyl azide)s include oxy-bis(4-sulfonylazidobenzene), 2,7- naphthalene bis(sulfonyl azido), 4,4'-bis(sulfonyl azido) biphenyl, 4,4'-diphenyl ether bis(sulfonyl azide) and bis(4-sulfonyl azidophenyl)methane, and mixtures thereof.

Sulfonyl azides are commercially available or are conveniently prepared by the reaction of sodium azide with the corresponding sulfonyl chloride, although oxidation of sulfonyl hydrazines with various reagents (nitrous acid, dinitrogen tetroxide, nitrosonium tetrafluoroborate) has been used.

In the practice of the invention preferably sufficient coupling agent is used to cause articles made from the resulting coupled impact propylene copolymer to exhibit a reduction in the difference between ductile-to-brittle transition temperatures measured parallel and perpendicular to the polymer injection flow direction as compared with the difference between ductile-to-brittle transition temperatures measured parallel and perpendicular to the polymer injection flow direction for an article fabricated from a comparable noncoupled impact propylene copolymer. When a bis(sulfonyl azide) is used for the coupling agent, preferably at least about 100 ppm of azide is used for coupling the impact propylene copolymer, based on the total weight of the impact propylene copolymer, more preferably at least about 150 ppm of azide, most preferably at least about 200 ppm of azide is used. In some instances, such as where a large reduction in the ductile-to-brittle transition temperature is desirable as compared with the base comparable noncoupled impact propylene copolymer, at least about 300 ppm of bis(sulfonyl azide), preferably at least about 450 ppm of bis(sulfonyl azide) based on the total weight of the impact propylene copolymer is used for coupling the impact propylene copolymer. It is important in choosing the impact propylene copolymer to be coupled, that a polymer is chosen that has a high enough melt flow rate, so that after coupling with the desired amount of coupling agent, the coupled impact propylene copolymer will have a sufficiently high melt flow rate to be readily processed.

In a preferred aspect of the invention the coupled impact propylene copolymer of the invention can be characterized by the following formula:

$$X=[(A-C)/(B-D)]\leq 0.75 \text{ and } Y\geq 1.25 \text{ and } A\leq B-10,$$

in which

A=the ductile-to-brittle transition temperature calculated from notched Izod values (Measured in accordance with ASTM D-256) measured with the notch perpendicular to the polymer injection flow direction for an article made from the coupled impact propylene copolymer resin.

B=the ductile-to-brittle transition temperature calculated from notched Izod values (Measured in accordance with ASTM D-256) measured with the notch perpendicular to the polymer injection flow direction for an article made from the comparable noncoupled impact propylene copolymer resin.

C=the ductile-to-brittle transition temperature calculated from notched Izod values (Measured in accordance with ASTM D-256) measured with the notch parallel to the polymer injection flow direction for an article made from the coupled impact propylene copolymer resin.

D=the ductile-to-brittle transition temperature calculated from notched Izod (Measured in accordance with ASTM D-256) measured with the notch parallel to the polymer injection flow direction for an article made from the comparable noncoupled impact propylene copolymer resin.

Y=the ratio of the melt strength of the coupled impact propylene copolymer resin to the melt strength of the comparable noncoupled impact propylene copolymer resin. Preferably, in this aspect, Y is at least about 1.5; more preferably, Y is at least about 2; most preferably, Y is at least about 5; and in some instances, Y is at least about 10.

Preferably, in this aspect, X is less than about 0.5, more preferably less than about 0.33, most preferably less than about 0.25.

For purposes of this invention: the value for A above may sometimes be referred to as the "parallel ductile-to-brittle transition temperature" for an article made from the coupled impact propylene copolymer; the value for B above may sometimes be referred to as the "parallel ductile-to-brittle transition temperature" for an article made from the comparable noncoupled impact propylene copolymer; the value for C above may sometimes be referred to as the "perpendicular ductile-to-brittle transition temperature" for an article made from the coupled impact propylene copolymer; and the value for D above may sometimes be referred to as the "perpendicular ductile-to-brittle transition temperature" for an article made from the comparable noncoupled impact propylene copolymer.

EXAMPLES

Polypropylene impact copolymer C105-02, available from The Dow Chemical Company, is a high impact propylene copolymer with a melt flow rate of 1.5 g/10 min and an ethylene content of 16 wt % was used to generate the results for Comparative Example 1. C105-02 was coupled with 450 ppm (based on the total weight of the polymers present) of 4,4'-oxy-bis-(sulfonylazido)benzene ("DPO-BSA") to produce the material used to generate the results shown for Example 1. C105-02 was coupled with 200 ppm of 4,4'-oxy-bis-(sulfonylazido)benzene (based on the total weight of the polymers present) to produce the material used to generate the results shown for Example 3.

Polypropylene impact copolymer DC111, available from the Dow Chemical Company, is a medium impact propylene copolymer with a melt flow rate of 0.8 g/lomin and an ethylene content of 9 wt % was used to generate the results for Comparative Example 2. DC111 was coupled with 200 ppm of 4,4'-oxy-bis-(sulfonylazido)benzene (based on the total weight of the polymers present) to produce the material used to generate the results shown for Example 2.

The preparation of the materials before extrusion was as follows:

For Example 1: the base resin C105-02 was tumbled with 2000 ppm of mineral oil for 30 minutes in drums, followed by the addition of 1000 ppm of tetrakis [Methylene (3,5-di-t-butyl-4-hydroxyhydrocinnamate)], which is available from the Ciba Specialty Chemicals Corporation under the trade name Irganox[1] 1010, 1000 ppm of Irgafos[2] 168 and the desired amount of 4,4'-oxy-bis-(sulfonylazido)benzene. This mixture was then tumbled for another 30 minutes. This mixture was then extruded through an 11-barrel Werner&Pfleiderer ZSK40 twin screw extruder at a feed rate of 250 lbs/hr, a screw speed of 300 rpm and with a target temperature profile of 180/190/200/200/210/220/230/240/230/240/240° C. (from feed inlet to die).

For Example 2: A concentrate of 5 wt % DPO-BSA in AFFINITY EG8200 (an ethylene-octene copolymer with a melt index of 5.0 g/min at 190° C., density 0.87 cm³ available from The Dow Chemical Company). This concentrate was fed simultaneously with the DC111 into the feed hopper of the extruder described in Example 1. Sufficient concentrate was fed to add 200 ppm of DPO-BSA (based on total weight of the polymers present) to the material being extruded. The mixture was extruded as described for Example 1, above.

For Example 3: A masterbatch of DPO-BSA in Profax 6501 (a 4 MFR propylene homopolymer available from Montell USA INC.) with 1000 ppm of Irganox 1010 and 1000 ppm of Irgafos 168 was prepared by tumbling the components together. This masterbatch was fed simultaneously with the C105-02 into the feed hopper of the extruder described in Example 1. The masterbatch formed 5 wt % of the total material fed into the extruder and the amount of DPO-BSA added was sufficient to add 200 ppm of DPO-BSA (based on total weight of the polymers present) to the material being extruded. The mixture was extruded as described for Example 1, above The resins for Comparative Example 1 and Comparative Example 2 and the resins obtained from Examples 1, 2 and 3 were tested for notched Izod at the temperatures as set forth in TABLES 1 and 2 following ASTM Method D-256 (as described in The annual book of ASTM standards, Section 8: Plastics, 1997). Edge-gated plaques were injection molded, of which the required test samples were cut parallel and perpendicular to the polymer injection flow direction. After notching, samples were tested with the orientation of the notch respectively perpendicular and parallel to the polymer injection flow direction.

The results of the impact testing are shown in the tables below, in which bold numbers indicate a ductile break. The data was analyzed using techniques known to one of skill in the art to determine the DBTT for the polymer resins of Comparative Examples 1 and 2 and Examples 1–3. These values for DBTT along with other information are listed in TABLE 3. The interpreted data show clearly that the impact properties of articles made from the coupled impact propylene copolymer resins of the Examples 1, 2, and 3 are more directionally balanced than that the impact properties of the articles made from the respective comparable noncoupled impact propylene copolymer resins of the Comparative Examples.

TABLE 1

Notched Izod With Notch Perpendicular to flow (J/m)

| Temperature (° C.) | Example 1 | Example 2 | Example 3 | Comparative Example 1 | Comparative Example 2 |
|---|---|---|---|---|---|
| 20 | | | | 801 | |
| 15 | | | | 694 | |
| 10 | | | | 534 | 368 |
| 5 | | | | 160 | 342 |
| 0 | 587 | 641 | 747 | 160 | 171 |
| -5 | | 502 | 187 | 160 | 85 |
| -10 | 641 | 379 | 171 | 107 | 91 |
| -15 | 214 | | | 53 | |
| -20 | 214 | 240 | 112 | 53 | 96 |
| -25 | | 75 | | | |

TABLE 2

Notched Izod With Notch Parallel to flow (J/m)

| Temperature (° C.) | Example 1 | Example 2 | Example 3 | Comparative Example 1 | Comparative Example 2 |
|---|---|---|---|---|---|
| 23 | | | | | 235 |
| 20 | | | | 587 | |
| 15 | | | | 214 | 176 |
| 10 | | | 336 | 214 | 160 |
| 5 | | | 208 | 107 | 117 |
| 0 | 587 | 550 | 149 | 107 | 85 |

TABLE 2-continued

Notched Izod With Notch Parallel to flow (J/m)

| Temperature (° C.) | Example 1 | Example 2 | Example 3 | Comparative Example 1 | Comparative Example 2 |
|---|---|---|---|---|---|
| -5 | | 240 | | | |
| -10 | 480 | 117 | 112 | | 75 |
| -15 | 160 | | | | |
| -20 | 107 | 96 | 101 | | 75 |

TABLE 3

| | Example 1 | Example 2 | Example 3 | Comparative Example 1 | Comparative Example 2 |
|---|---|---|---|---|---|
| A (° C.) | -15.0 | -20.0 | -2.5 | | |
| B (° C.) | 7.5 | 2.5 | 7.5 | 7.5 | 2.5 |
| C (° C.) | -12.5 | -7.5 | 5 | | |
| D (° C.) | 17.5 | 23.0 | 17.5 | 17.5 | 23.0 |
| X | 0.25 | 0.61 | 0.75 | 1.00 | 1.00 |
| Melt Strength (cN) | 64 | 70 | 8 | 5 | 7.9 |
| Y | 12.8 | 8.9 | 1.6 | | |
| A - B (° C.) | -22.5 | -22.5 | -10.0 | | |

Melt flow rate (MFR) for all the samples was measured at 230° C. with a 2.16 kg weight according to the method of ASTM D1238.

Melt Strength for all the samples was measured by using a capillary rheometer fitted with a 2.1 mm diameter, 20:1 die with an entrance angle of approximately 45 degrees. After equilibrating the samples at 190° C. for 10 minutes, the piston was run at a speed of 1 inch/minute. The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. For the polymer of Example 1, the melt strength was 64 cN and the melt strength of the polymer of Comparative Example 1 was 5 cN.

The coupled impact propylene copolymer of the invention may advantageously be blended with other propylene polymers, including homopolymer propylene polymers, random propylene copolymers and other impact propylene polymers or with other polyolefins to made thermoplastic olefins (TPO's) or thermoplastic elastomers (TPE's); optionally the other propylene polymers or polyolefins may be coupled with coupling agents.

This invention is also useful for filled polypropylene systems, i.e. with mineral fillers such as talc or calcium carbonate. Additionally, it is believed that in some instances nucleating agents preferably may be utilized with the practice of the invention. These nucleating agents increase the rate at which the resins crystallize and, in some instances, may help lower the DBTT of articles formed from the resulting polymer resins. However, in some instances, the presence of a nucleating agent in a coupled impact propylene copolymer, may reduce the balance of the impact properties of an article formed from the coupled impact propylene copolymer. Examples of nucleating agents which may be used are NA-11, which is available from ASAHI DENKA Corporation.

The coupled impact propylene copolymers of the invention are useful for the fabrication of articles via (extrusion or injection) blow molding, injection molding, rotomolding, profile extrusion, sheet extrusion, pipe extrusion, thermoforming, and foaming. These articles of manufacture will exhibit improved impact properties, including, improved directionally balanced impact properties, as compared with articles made from comparable noncoupled impact propylene copolymers.

The coupled impact propylene copolymers of the invention may also be formed into cast and blown film and may be used for extrusion coating. These coupled impact propylene copolymers are more readily processed into films under a wider range of processing conditions than comparable noncoupled propylene copolymers.

We claim:

1. A composition comprising a coupled impact propylene copolymer formed by the reaction of a coupling agent having at least two reactive groups that are each capable of forming a carbene or nitrene group with an impact propylene copolymer comprising an in-reactor blend having a continuous polypropylene phase and a dispersed elastomeric phase.

2. The composition of claim 1, wherein the elastomeric phase is present in an amount of at least about 9 weight percent of the coupled impact propylene copolymer.

3. The composition of claim 1, wherein the elastomeric phase is present in an amount of at least about 13 weight percent of the coupled impact propylene copolymer.

4. The composition of claim 1, wherein an article formed from the coupled impact propylene copolymer exhibits improved directional balanced impact properties as compared with an article formed from a comparable noncoupled impact propylene copolymer.

5. The composition of claim 4, wherein a parallel ductile-to-brittle transition temperature for the article formed from the coupled impact propylene copolymer is 10° C. less than a parallel ductile-to-brittle transition temperature for the article formed from the comparable noncoupled impact propylene copolymer.

6. The composition of claim 4, wherein a parallel ductile-to-brittle transition temperature for the article formed from the coupled impact propylene copolymer is 15° C. less than a parallel ductile-to-brittle transition temperature for the article formed from the comparable noncoupled impact propylene copolymer.

7. The composition of claim 4, wherein a parallel ductile-to-brittle transition temperature for the article formed from the coupled impact propylene copolymer is 20° C. less than a parallel ductile-to-brittle transition temperature for the article formed from the comparable noncoupled impact propylene copolymer.

8. The composition of claim 4, wherein a parallel ductile-to-brittle transition temperature for the article formed from the coupled impact propylene copolymer is 25° C. less than a parallel ductile-to-brittle transition temperature for the article formed from the comparable noncoupled impact propylene copolymer.

9. The composition of claim 4, wherein a parallel ductile-to-brittle transition temperature for the article formed from the coupled impact propylene copolymer is less than −50° C.

10. The composition of claim 4, wherein a parallel ductile-to-brittle transition temperature for the article formed from the coupled impact propylene copolymer is less than −10° C.

11. The composition of claim 4, wherein a parallel ductile-to-brittle transition temperature for the article formed from the coupled impact propylene copolymer is less than −15° C.

12. The composition of claim 4, wherein a parallel ductile-to-brittle transition temperature for the article formed from the coupled impact propylene copolymer is less than −20° C.

13. The composition of claim 1, wherein a parallel ductile-to-brittle transition temperature for an article formed from the coupled impact propylene copolymer is less than −10° C.

14. The composition of claim 1, wherein a parallel ductile-to-brittle transition temperature for an article formed from the coupled impact propylene copolymer is at least 10° C. less than a parallel ductile-to-brittle transition temperature for an article formed from a comparable noncoupled impact propylene compolymers.

15. The composition of claim 14, wherein the parallel ductile-to-brittle transition temperature for the article formed from the coupled impact proylene copolymer is less than −15° C.

16. The composition of claim 6, wherein the parallel ductile-to-brittle transition temperature for the article formed from the coupled impact propylene copolymer is less than −15° C.

17. The composition of claim 7, wherein the parallel ductile-to brittle transition temperature for the article formed from the coupled impact propylene copolymer is less than −20° C.

18. The composition of claim 1, wherein the coupled impact propylene copolymer is characterized by the following formula:

$$X=[(A-C)/(B-D)] \leq 0.75 \text{ and } Y \geq 1.25 \text{ and } A \leq B-10, \text{ wherein:}$$

A=a parallel ductile-to-brittle transition temperature for an article made from the coupled impact propylene copolymer;

B=a parallel ductile-to-brittle transition temperature for an article made from a comparable noncoupled impact propylene copolymer;

C=a perpendicular ductile-to-brittle transition temperature for the article made from the coupled impact propylene copolymer;

D=a perpendicular ductile-to-brittle transition temperature for the article made from the comparable noncoupled impact propylene copolymer resin; and Y=a ratio of a melt strength of the coupled impact propylene copolymer to the melt strength of the comparable noncoupled impact propylene copolymer.

19. The composition of claim 18, wherein Y is at least about 1.5.

20. The composition of claim 18, wherein Y is at least about 3.

21. The composition of claim 18, wherein Y is at least about 5.

22. The composition of claim 18, wherein X is less than about 0.5.

23. The composition of claim 18, wherein X is less than about 0.33.

24. The composition of claim 18, wherein X is less than about 0.25.

25. An article of manufacture comprising the composition of any of claims 18–24, wherein the article of manufacture is selected from an extruded article, an injection molded article, a blow molded article, a bottle, a blow molded bottle, a rotomolded article, a profile extruded article, an extruded sheet, a pipe extrusion, a thermoformed article, a foam or a combination thereof.

26. An article of manufacture comprising the composition of any of claims 6–24, wherein the article of manufacture is a film.

27. A process for making a coupled impact propylene copolymer comprising the steps of: mixing a coupling agent having at least two reactive groups that are each capable of forming a carbene or nitrene group with an impact propylene copolymer comprising an in-reactor blend having a continuous polypropylene phase and a dispersed elastomeric phase; and heating the mixture.

28. The process of claim 27, wherein the process is carried out in a mixer which mixes the coupling agent and the impact propylene copolymer and provides sufficient heat to cause reaction between the coupling agent and the impact propylene copolymer.

29. The process of claim 27, wherein the process is carried out in a polymer extruder.

\* \* \* \* \*